United States Patent [19]

Habu et al.

[11] 4,108,848
[45] Aug. 22, 1978

[54] METHOD FOR HARDENING GELATIN

[75] Inventors: Teiji Habu; Hisashi Yamaguchi; Takashi Sasaki; Tsuneo Wada; Masayuki Matsumoto; Takayoshi Omura; Hiroki Ishii, all of Hino, Japan

[73] Assignee: Konishiroku Photo Industry Co., Ltd., Tokyo, Japan

[21] Appl. No.: 511,917

[22] Filed: Oct. 3, 1974

[30] Foreign Application Priority Data
Oct. 8, 1973  Japan .................................. 48-112325

[51] Int. Cl.² .............................................. C09H 7/00
[52] U.S. Cl. ...................................... 260/117; 96/111
[58] Field of Search .......................... 96/111; 260/117

[56] References Cited
U.S. PATENT DOCUMENTS

| 3,444,156 | 5/1969 | Montmollin | 260/117 |
| 3,455,892 | 7/1969 | Froehlich | 260/117 |
| 3,455,893 | 7/1969 | Froehlich | 260/117 |
| 3,490,911 | 1/1970 | Burness | 96/111 |
| 3,635,718 | 1/1972 | Froehlich | 96/111 |
| 3,640,720 | 2/1972 | Cohen | 96/111 |
| 3,689,274 | 9/1972 | Sobel | 96/111 |
| 3,749,573 | 7/1973 | Froehlich | 96/50 R |
| 3,841,872 | 10/1974 | Burness | 260/117 |
| 3,868,257 | 2/1975 | Horii | 96/111 |
| 4,001,201 | 1/1977 | Kyburz | 260/117 |

Primary Examiner—Paul R. Michl
Attorney, Agent, or Firm—Haseltine, Lake & Waters

[57]  ABSTRACT

Gelatin, particularly gelatin films of light-sensitive silver halide photographic materials, are hardened by treating with a combination of a compound having at least two vinylcarbonyl groups in the molecule with a compound having at least two vinylsulfonyl groups in the molecule.

7 Claims, No Drawings

METHOD FOR HARDENING GELATIN

This invention relates to a method for hardening gelatin using a hardener, particularly to a gelatin-hardening method suitable for the hardening of gelatin films of light-sensitive silver halide photographic materials.

Generally, light-sensitive silver halide photographic materials are prepared by forming various layers such as silver halide emulsion layer, filter layer, inter layer, protective layer, sub layer, antihalation layer, etc. on a suitable support such as glass, paper or synthetic resin film. Since these layers are so-called gelatin films composed mainly of gelatin, the physical properties of said layers are dependent chiefly upon those of gelatin. However, gelatin itself has such properties as being low in melting point, high in water-swellability and inferior in mechanical strength, which properties are fatal disadvantages as the physical properties of layers constituting light-sensitive silver halide photographic materials. In order to improve the physical properties of gelatin, various hardeners have heretofore been applied to gelatin to cause crosslinking with amino, carboxyl, amide or the like functional groups in the molecules of gelatin. As such hardeners, there have been known from old times inorganic hardeners composed of polyvalent metal salts such as chromium alum, chromium chloride and the like chromium salts, or aluminum salts, and organic hardeners such as formalin, glyoxal, acrolein and their derivatives, for example. When viewed from the photographic standpoint, however, the said hardeners have many disadvantage such as, for example, they cause strong desensitization, accelerate fogging, disturb the color-forming ability of couplers in photographic emulsions, or are excessively quick in hardening action to make the production of photographic materials difficult or, conversely, cannot give desired hardening effects unless emulsions incorporated therewith are incubated over a long period of time. Thus, most of the hardeners have various drawbacks.

Moreover, with recent speed-up of industries, photographic materials are demanded to be processed at high speeds. Accordingly, photographic materials themselves are being improved so as to conform to quick processing, and developers also are being improved so as to be suitable for rapid development of such photographic materials. For example, in order to make the penetration of processing liquids quicker, photographic materials are made thinner by increasing the amount of silver halide and decreasing the amount of gelatin, with the result that the amount of fog formed becomes larger and the film properties are further deteriorated. In addition thereto, with the recent spread of automatic processing machines, photographic materials are required to be high in mechanical strength so as to withstand severe mechanical abrasion, and with the spread of high-temperature short-period processing using strong processing liquids, they are required to be stronger in film properties without degradation in photographic properties.

As the result of such quick processing of photographic materials as mentioned above, most of the compounds which have heretofore been known as excellent hardeners bring about various disadvantages. For example, if only the amount of the hardener added to a photographic material is increased in order to make gelatin strong in film properties, not only is the photographic material increased in desensitization and fog but also the gelatin in the photographic material is deteriorated in covering power. Even if the photographic material is increased in film hardness, the films will be so brittle that it becomes difficult to apply the photographic material to an automatic processing machine.

An object of the present invention is to provide a hardener which brings about no such disadvantages as mentioned above. Another object of the invention is to provide a method for hardening gelatin by use of the said hardener which is particularly suitable for the hardening of gelatin films of light-sensitive silver halide photographic materials.

The above-mentioned objects can be accomplished by using, as the hardener, a combination of a compound having at least two vinylcarbonyl groups in the molecule with a compound having at least two vinylsulfonyl groups in the molecule.

That is, when a combination of one or two or more compounds having at least two vinylcarbonyl groups in the molecule with one or two or more compounds having at least two vinylsulfonyl groups in the molecule is incorporated into a photographic material, gelatin films of the photographic material can successfully be hardened without accompanying desensitization and increased fogging even in the case where the photographic material has been made thinner by decreasing the amount of gelatin. Further, even when the photographic material is subjected to high temperature processing using strong processing liquids, the combination of said compounds does not increase the amount of fog but displays excellent hardening capable of withstanding not only the high temperature processing but also such mechanical abrasion as encountered in an automatic processing machine. Moreover, the said hardening action is displayed quite quickly and, in case the hardener, i.e., the combination of said compounds, is incorporated into a coating liquid for forming a gelatin film, for example, the desired hardening quickly occurs immediately after coating of the liquid, and the so-called post-hardening due to spontaneous incubation or heat treatment scarcely takes place to make it possible to obtain a light-sensitive silver halide photographic material stabilized in quality. Such markedly quick hardening action is a synergistic action and is entirely unexpected from the case where the compounds used in combination in the present invention are employed singly.

Typical examples of the compound having at least two vinylcarbonyl groups in the molecule, which compound is used in the present invention, are as follows:

(I-1)  CH$_2$=CHCOCH=CH$_2$ (I-2) 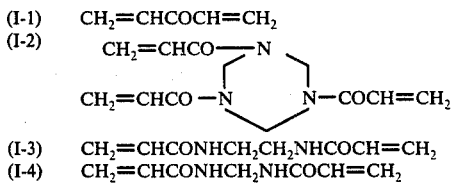

(I-3)  CH$_2$=CHCONHCH$_2$CH$_2$NHCOCH=CH$_2$
(I-4)  CH$_2$=CHCONHCH$_2$NHCOCH=CH$_2$

-continued (I-5) CH$_2$=CHCONHCH$_2$CH$_2$CH$_2$NHCOCH=CH$_2$
(I-6) CH$_2$=CHCONHCONHCOCH=CH$_2$
(I-7) 
CH$_2$OCONHCOCH=CH$_2$
|
CHOCONHCOCH=CH$_2$
|
CH$_2$OCONHCOCH=CH$_2$ (I-8)
CH$_2$OCONHCOCH=CH$_2$
|
CHOCONHCOCH=CH$_2$
|
CHOCONHCOCH=CH$_2$
|
CH$_2$OCONHCOCH=CH$_2$

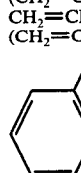

(I-10) (CH$_2$=CHCONHCONHSO$_2$NHCOOCH$_2$)$_2$
(I-11) (CH$_2$=CHCONHCONHSO$_2$NHCOOCH$_2$CH$_2$CH$_2$)$_2$
(I-12) (CH$_2$=CHCONHCONHSO$_2$NHCOOCH$_2$CH$_2$CH$_2$CH$_2$)$_2$
(I-13) (CH$_2$=CHCONHCONHSO$_2$NHCOOCH$_2$CH$_2$)$_2$O
(I-14) (CH$_2$=CHCONHCONHSO$_2$NHCOOCH$_2$CH$_2$OCH$_2$)$_2$
(I-15) (CH$_2$=CHCONHCONHSO$_2$NHCONHCOCH$_2$CH$_2$)$_2$
(I-16) CH$_2$=CHCONHCOOCH$_2$CH$_2$—(OCH$_2$CH$_2$)$_3$OCONHCOCH=CH$_2$
(I-17) CH$_2$=CHCONHCOOCH$_2$CH$_2$SCH$_2$CH$_2$OCONHCOCH=CH$_2$
(I-18) CH$_2$=CHCONHCONHCH$_2$CH$_2$NHCONHCOCH=CH$_2$
(I-19) CH$_2$=CHCONHCONHCONHCONHCOCH=CH$_2$
(I-20) (CH$_2$=CHCONHCOOCH$_2$CH$_2$)$_2$
(I-21) CH$_2$=CHCONHCOSCH$_2$CH$_2$SCONHCOCH=CH$_2$
(I-22) (CH$_2$=CHCONHCONHCOCH$_2$CH$_2$)$_2$
(I-23)

SO$_2$NHCONHCOCH=CH$_2$ (benzene ring) SO$_2$NHCONHCOCH=CH$_2$

The above-mentioned compounds can be easily synthesized according to the processes disclosed in, for example, U.S. Pat. No. 3,640,720, British Patent No. 994,869, West German Patent No. 872,153, and Japanese Patent Publication Nos. 106/1971 and 13141/1972. The compound having at least two vinylcarbonyl groups in the molecule, which is used in the present invention, includes the aforesaid compound (I-1) or the like compound having such structure as being equivalent to two vinylcarbonyl groups wherein one —CO— group is doubly linked to two vinyl groups.

Typical examples of the compound having at least two vinylsulfonyl groups in the molecule, which compound is used in the present invention in combination with the aforesaid compound having vinylcarbonyl groups, are as follows:

(II-1) CH$_2$=CHSO$_2$CH$_2$CH$_2$SO$_2$CH=CH$_2$
(II-2) CH$_2$=CHSO$_2$CH$_2$CH$_2$CH$_2$CH$_2$CH$_2$CH=CH$_2$
(II-3) CH$_2$=CHSO$_2$—N(piperazine)N—SO$_2$CH=CH$_2$ (II-4) 
triazine ring with SO$_2$CH=CH$_2$ substituents; CH$_2$=CHSO$_2$ and SO$_2$CH=CH$_2$ on the ring (II-5) CH$_2$=CH—SO$_2$—N(CH(CH$_3$)—CH(CH$_3$))N—SO$_2$CH=CH$_2$ -continued
(II-6) 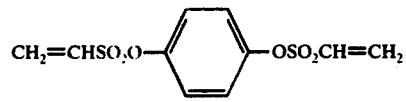
(II-7) 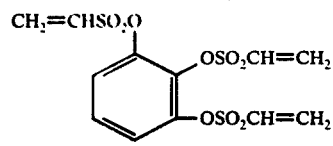
(II-8) 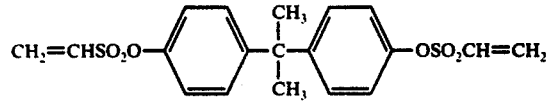
(II-9) 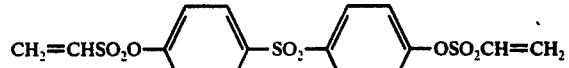
(II-10) 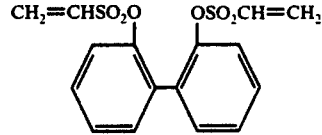
(II-11) 
(II-12) 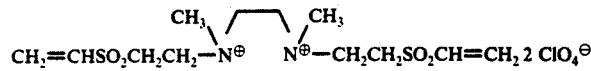
(II-13) 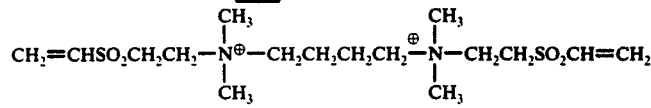    
(II-14) $CH_2=CHSO_2CH_2CH_2SO_2CH_2CH_2SO_2CH=CH_2$
(II-15) $CH_2=CHSO_2CH_2CH_2OCH_2CH_2NHCONHCH_2CH_2OCH_2CH_2SO_2CH=CH_2$
(II-16) $CH_2=CHSO_2CH_2CH_2OCH_2CH_2OCH_2CH_2SO_2CH=CH_2$
(II-17) $CH_2=CHSO_2CH_2CH_2OCH_2CH_2CH_2CH_2OCH_2CH_2SO_2CH=CH_2$
(II-18) 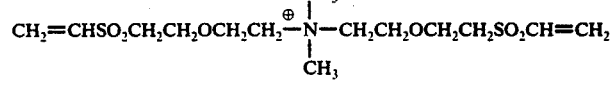    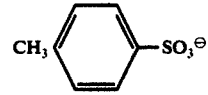
(II-19) 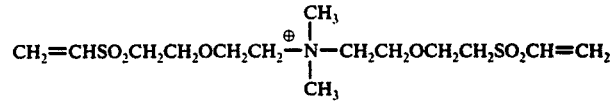    $ClO_4^\ominus$
(II-20) 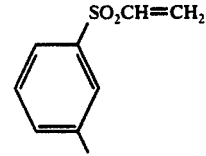
(II-21) 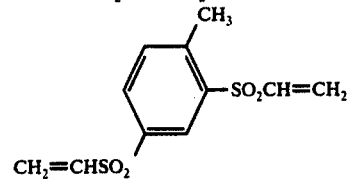

-continued
(II-22) 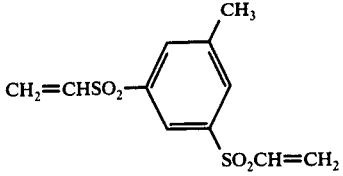
(II-23) 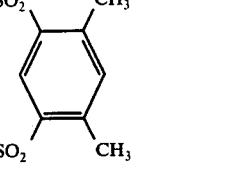
(II-24) 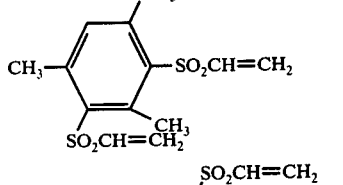
(II-25) 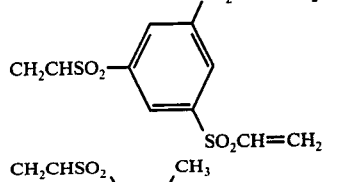
(II-26) 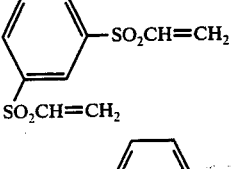
(II-27) 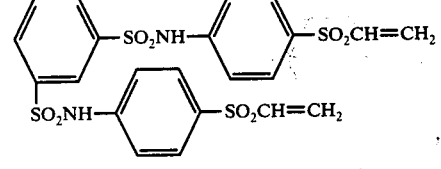
(II-28) 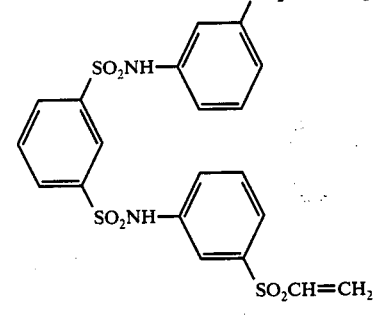
(II-29) 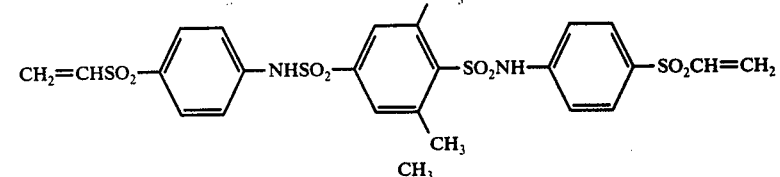
(II-30) 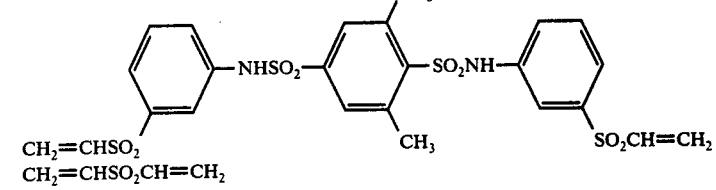
(II-31) CH$_2$=CHSO$_2$CH=CH$_2$ (II-32) 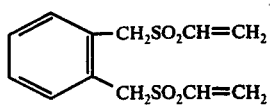
(II-33) 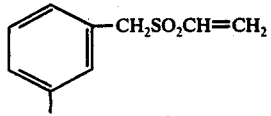
(II-34) 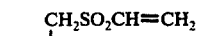
(II-35) 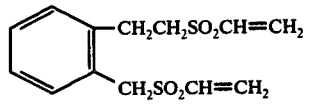
(II-36) 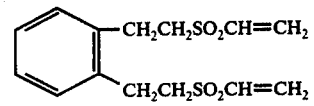
(II-37) 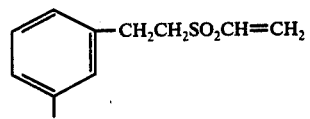
(II-38) 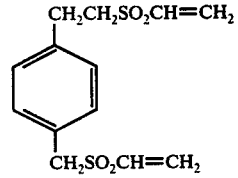
(II-39) 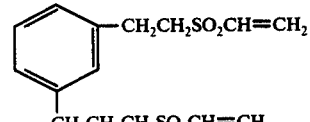
(II-40) 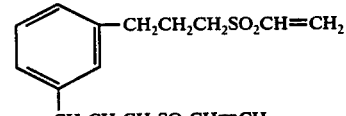
(II-41) 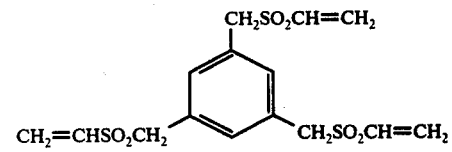
(II-42) 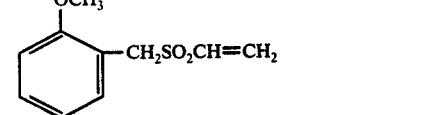
(II-43) 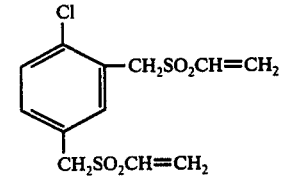

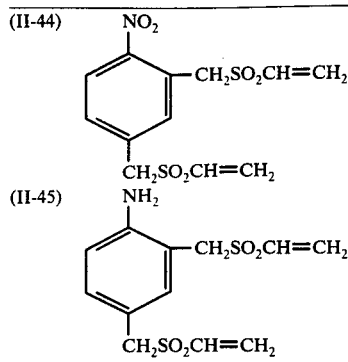

(II-44)

(II-45)

The above-mentioned compounds can be easily synthesized according to the processes disclosed in, for example, West German Patent No. 1,100,942, U.S. Pat. No. 3,490,911 and Japanese Patent Publication No. 8736/1972. The compound having at least two vinylsulfonyl groups in the molecule, which is used in the present invention, includes the aforesaid compound (II-31) or the like compound having such structure as being equivalent to two vinylsulfonyl groups wherein one $-SO_2-$ group is doubly linked to two vinyl groups.

The term "gelatin" referred to in the present invention means not only gelatin itself but also gelatin derivatives. As such gelatin derivatives, there may be shown, for example, acylated gelatin, guanidylated gelatin, carbamylated gelatin, cyanoethylated gelatin and esterified gelatin.

For the hardening of gelatin films of a light-sensitive silver halide photographic material, the hardener may be incorporated into any of the gelatin films, as photographic layers composed mainly of gelatin, such as sub layer, emulsion layer, inter layer, protective layer and backing layer, of the photographic material. Alternatively, the photographic material bearing said photographic layer may be immersed in a solution incorporated with the hardener. It is also possible to harden the gelatin films of the photographic material at the time of development by using any type of bath incorporated with the hardener. In the above case, the hardener may be used in combination with other hardener in such an amount as not to damage the effect of the present invention.

In incorporating the hardener according to the present invention into any of the photographic layers of a light-sensitive silver halide photographic material, the hardener is dissolved in water or one or more of conventional organic solvents such as methanol, dimethylformamide and ketones, and the resulting solution is added to a coating liquid for forming the photographic layer. It is also possible to overcoat the outer-most layer of the photographic layers with the above-mentioned solution of the hardener.

The amount of the hardener to be added to a coating liquid for forming a gelatin film varies depending on the kind and desired physical and photographic properties of the gelatin film, but is ordinarily 0.01 to 100% by weight, preferably 0.1 to 10% by weight, based on the dry weight of gelatin in the coating liquid. In this case, the amounts of the compounds constituting the hardener vary depending on the kind and desired properties of the gelatin film, but are desirably such that the amount of either one of the compounds is made at least 10% by weight of the total amount of the compounds.

The hardener may be added at any stage during preparation of the coating liquid for forming the gelatin film. To a silver halide emulsion for example, however, the hardener is preferably added after second ripening of the emulsion.

Light-sensitive silver halide photographic materials, to which the present invention is applicable, may be any of black-and-white, color and pseudo-color photographic materials, and include all of negative-, positive- and diffusion transfer-type photographic materials for general use and for printing, X-rays, radiations, etc.

Silver halide emulsions used in the above-mentioned light-sensitive silver halide photographic materials may contain as photosensitive component each and every kind of silver halides such as silver chloride, silver iodide, silver bromide, silver iodobromide, silver chlorobromide, silver chloroiodobromide. Further, the emulsions may have been subjected either to such various chemical sensitization as noble metal sensitization using noble metals such as ruthenium, rhodium, palladium, irridium, platinum, gold, etc. which are, for example, ammonium chloropalladate, potassium chloroplatinate, potassium chloropalladite and potassium chloroaurate; sulfur sensitization using sulfur compounds; reduction sensitization using stannous salts or polyamines; and sensitization using polyalkylene oxide type compounds, or to optical sensitization using cyanine dyes, merocyanine dyes or compounded cyanine dyes. Still further, the emulsions may have been incorporated with various couplers such as colorless couplers, colored couplers or development inhibitor-yielding couplers; stabilizers such as mercury compounds, triazole type compounds, azaindene type compounds, benzothiazolium type compounds or zinc compounds; wetting agents such as dihydroxyalkanes; film property-improvers composed of water-dispersible particulate high polymers obtained by the emulsion polymerization of alkyl acrylate- or alkyl methacrylate-acrylic or methacrylic acid copolymers, styrene-maleic acid copolymers or styrene-maleic anhydride half alkyl ester copolymers, coating aids such as polyethylene glycol lauryl ethers; and other various photographic additives.

Furthermore, hydrophilic colloids, which are advantageously used for preparation of the emulsions, include gelatin, colloidal albumin, agar, gum arabic, dextran, alginic acid, cellulose derivatives such as cellulose acetate hydrolyzed to an acetyl content of 19 to 26%, polyacrylamides, imidated polyacrylamides, zein, vinyl alcohol polymers containing urethane-carboxylic acid groups or cyanoacetyl groups, such as vinyl alcohol-vinyl cyanoacetate copolymers, polyvinyl alcohols, polyvinyl pyrrolidones, hydrolyzed polyvinyl acetates, polymers obtained by the polymerization of proteins or saturated acylated proteins with monomers having vinyl groups, polyvinyl pyridines, polyvinyl amines, polyaminoethyl methacrylates and polyethyleneimines. These hydrophilic colloids are used also in the case of forming photographic layers other than the emulsion layer of photographic materials such as inter layer, protective layer, filter layer, backing layer, etc.

As supports for the light-sensitive silver halide photographic materials, there may be used films composed of polyethylene terephthalates, polycarbonates, polystyrenes, polypropylenes or cellulose acetate, or baryta or polyethylene-laminate papers.

When applied to gelatin films of light-sensitive silver halide photographic materials, the hardener according to the present invention exhibits its effective hardening ability without deteriorating the photographic properties such as speed, etc. of the photographic emulsion layers. Since the hardening action is displayed quite quickly and no post-hardening is substantially brought about, it is possible to obtain photographic materials stabilized in quality. Moreover, even when the photographic materials are stored over a long period of time, the hardener gives no detrimental effect to the photographic emulsion layers but rather makes them more stable, and imparts thereto excellent hardness capable of sufficiently withstanding high temperature quick processing and automatic processing.

The present invention is illustrated in more detail below with reference to examples, but modes of practice of the invention are not limited to the examples, and various modifications are possible within the scope of the invention.

EXAMPLE 1

A silver iodobromide-gelatin emulsion containing 1.7 mole% of silver iodide was incorporated with a gold sensitizer and subjected to second ripening. Thereafter, the emulsion was charged with 4-hydroxy-6-methyl-1,3,3a,7-tetrazaindene, and then equally divided into four emulsions. One of these emulsions was coated per se on a polyester film base and then dried to prepare a control sample. Two of the remaining emulsions were individually incorporated with each of methanol solutions of the compounds (I-2) and (II-1), respectively, in a proportion of $1 \times 10^{-4}$ mole per gram of the gelatin in each emulsion, while the remaining emulsion was incorporated with a methanol solution of a mixture of the compounds (I-2) and (II-1), each in a proportion of $0.5 \times 10^{-4}$ mole per gram of the gelatin in the emulsion. These three emulsions were individually coated on a polyester film base and then dried to prepare three samples.

The thus prepared control sample and three samples were measured in film hardness according to the following process:

Each sample was incubated at a temperature of 25° C. and a relative humidity (RH) of 55% for each of 1 day (24 hours), 15 days and 30 days. Thereafter, the sample was immersed in a 1.5% aqueous sodium hydroxide solution kept at 50° C., and the time required for initiation of dissolution of the gelatin film of the sample was measured. On the other hand, each sample, which had been incubated under the above conditions, was immersed for 3 minutes in a 3% aqueous sodium carbonate solution at 25° C. Immediately thereafter, the surface of the gelatin film of the sample was rubbed and then scratched with a sapphire needle having a pin point of 1 mm. in radius, and the load (g) required for initiation of formation of scratch on the film surface was measured and represented as film strength. Separately, each sample, which had been incubated at 25° C. and 55% RH for 1 day, was exposed according to the method described in JIS, developed at 40° C. for 30 seconds with an ordinary high temperature quick processing developer containing hydroquinone and phenidone as developing agents, and then measured in speed and fog. The results obtained in the above cases were as shown in Table 1, in which the speed is a relative value measured by assuming the speed of the control sample as 100.

Table 1

| Compound | Film hardness characteristics | | | | | | Photographic properties | |
|---|---|---|---|---|---|---|---|---|
| | Dissolution initiation time (min) After incubation for | | | Film strength (g) After incubation for | | | | |
| | 1 day | 15 days | 30 days | 1 day | 15 days | 30 days | Speed | Fog |
| — | 0.5 | 0.6 | 0.8 | 5 | 10 | 15 | 100 | 0.10 |
| Compound (I-2) | 1 | 5 | 15 | 20 | 100 | 150 | 98 | 0.09 |
| Compund (II-1) | 2 | 5 | 10 | 120 | 170 | 200 | 97 | 0.09 |
| Compound (I-2) Compound (II-1) | 10 | 14 | 20 | 160 | 190 | 220 | 96 | 0.09 |

As is clear from Table 1, it is understood that the combination of two compounds according to the present invention shows extremely quick and excellent hardening action without deteriorating the photographic properties.

EXAMPLE 2

A control sample and three samples were prepared in the same manner as in Example 1, except that the compounds used as the hardeners were replaced by the compounds (I-23) and (II-4). Each sample was measured in film hardness and photographic properties according to the same procedures as in Example 1. The results obtained were as shown in Table 2, in which the speed is a relative value measured by assuming the speed of the control sample as 100.

Table 2

| Compound | Film hardness characteristics | | | | | | Photographic properties | |
|---|---|---|---|---|---|---|---|---|
| | Dissolution initiation time (min) After incubation for | | | Film strength (g) After incubation for | | | | |
| | 1 day | 15 days | 30 days | 1 day | 15 days | 30 days | Speed | Fog |
| — | 0.5 | 0.6 | 0.8 | 5 | 10 | 15 | 100 | 0.11 |

Table 2-continued

| | Film hardness characteristics | | | | | | Photographic properties | |
|---|---|---|---|---|---|---|---|---|
| | Dissolution initiation time (min) | | | Film strength (g) | | | | |
| | After incubation for | | | After incubation for | | | | |
| Compound | 1 day | 15 days | 30 days | 1 day | 15 days | 30 days | Speed | Fog |
| Compound (I-23) | 2 | 4 | 23 | 80 | 160 | 200 | 99 | 0.10 |
| Compound (II-4) | 6 | 12 | 20 | 150 | 200 | 260 | 97 | 0.10 |
| Compund (I-23) Compound (II-4) | 17 | 20 | 25 | 190 | 240 | 280 | 96 | 0.10 |

As is clear from Table 2, it is understood that in this example also, the combination of two compounds according to the present invention shows quick and excellent hardening action, like in Example 1, without deteriorating the photographic properties.

EXAMPLE 3

A green-sensitive high speed color photographic silver iodobromide-gelatin emulsion containing 3 mole% of silver iodide was subjected to second ripening, and then incorporated with 1-(4'-phenoxy-3'-sulfophenyl)-3-heptadecyl-5-pyrazolone as a magenta coupler. Thereafter, the emulsion was equally divided into four emulsions. One of these emulsions was coated as it was on a cellulose triacetate film base and then dried to prepare a control sample. Two of the remaining emulsions were individually incorporated with each of methanol solutions of the compounds (I-6) and (II-20), respectively, in a proportion of $1 \times 10^{-4}$ mole per gram of the gelatin in each emulsion, while the remaining one emulsion was incorporated with a methanol solution of a mixture of the compounds (I-6) and (II-20), each in a proportion of $0.5 \times 10^{-4}$ mole per gram of the gelatin in the emulsion. These three emulsions were individually coated on a cellulose triacetate film base to prepare three samples.

The film hardness characteristics of each sample were measured according to the same procedures as in Example 1. Further, the photographic properties of each sample were measured in such a manner that the sample was subjected to color development using a color developer containing diethyl-p-phenylenediamine as a developing agent, and the developed sample was subjected to ordinary bleaching, fixing and water-washing and then to sensitometry to measure the speed and fog thereof. The results obtained were as shown in Table 3, in which the speed is a relative value measured by assuming the speed of the control sample as 100.

Table 3

| | Film hardness characteristics | | | | | | Photographic properties | |
|---|---|---|---|---|---|---|---|---|
| | Dissolution initiation time (min) | | | Film strength (g) | | | | |
| | After incubation for | | | After incubation for | | | | |
| Compound | 1 day | 15 days | 30 days | 1 day | 15 days | 30 days | Speed | Fog |
| — | 0.5 | 0.7 | 0.8 | 5 | 10 | 15 | 100 | 0.12 |
| Compund (I-6) | 4 | 10 | 16 | 120 | 170 | 220 | 99 | 0.11 |
| Compound (II-20) | 5 | 11 | 18 | 110 | 160 | 200 | 98 | 0.11 |
| Compound (I-6) Compound (II-20) | 18 | 21 | 24 | 180 | 200 | 240 | 96 | 0.11 |

As is clear from Table 3, it is confirmed that the combination of two compounds according to the present invention shows extremely quick hardening action, as in the preceding Examples, and does not disturb the color formation of the coupler nor form any color stains.

What we claim is:

1. A method for hardening gelatin, which comprises treating the gelatin with a combination of a compound having at least two vinylcarbonyl groups in the molecule and a compound having at least two vinylsulfonyl groups in the molecule.

2. The method as claimed in claim 1, wherein said vinylcarbonyl group-bearing compound is any one of the exemplified compounds (I-1) to (I-23) as described in the specification and said vinylsulfonyl group-bearing compound is any one of the exemplified compounds (II-1) to (II-45) as described in the specification.

3. The method as claimed in claim 1, wherein said gelatin is that which exists in a gelatin-containing photographic layer of a light-sensitive silver halide photographic material.

4. The method as claimed in claim 1 wherein said compound is incorporated into a processing liquid which is to be brought into contact with a gelatin-containing layer of an exposed light-sensitive silver halide photographic material.

5. The method as claimed in claim 1, wherein said gelatin is that which exists in a gelatin-containing liquid capable of forming a photographic layer of a light-sensitive silver halide photographic material.

6. The method as claimed in claim 1, wherein said hardener combination is used in the amount of from 0.01 to 100% by weight, and preferably from 0.1 to 10% by weight, based on the dry weight of the gelatin, either one component of said combination comprising at least 10% by weight of said combination.

7. The modified gelatin which is obtained by reacting a gelatin with a combination of a compound having at least two vinylcarbonyl groups in the molecule and a compound having at least two vinylsulfonyl groups in the molecule.

* * * * *